United States Patent
Bullard

[15] 3,666,834
[45] May 30, 1972

[54] ORIENTED THERMOPLASTIC FILMS COMPRISING POLYPROPYLENE AND POLY(PARA-TERTIARY-BUTYL-STYRENE)

[72] Inventor: Edward M. Bullard, Rochester, N.Y.
[73] Assignee: Mobil Oil Corporation
[22] Filed: July 29, 1970
[21] Appl. No.: 59,331

[52] U.S. Cl. .................................260/897 A, 264/289
[51] Int. Cl. ..........................................C08f 29/12
[58] Field of Search................................260/897

[56] References Cited

UNITED STATES PATENTS

| | | | |
|---|---|---|---|
| 3,173,163 | 3/1965 | Cramton | 15/159 |
| 3,092,891 | 6/1963 | Baratti | 28/82 |
| 3,018,263 | 1/1962 | Schneider | 260/45.5 |
| 3,246,061 | 4/1966 | Blatz | 264/95 |

*Primary Examiner*—Samuel H. Blech
*Assistant Examiner*—C. J. Seccuro
*Attorney*—Oswald G. Hayes, Andrew L. Gaboriault and James D. Tierney

[57] ABSTRACT

A resinous blend composition, adaptable for fabrication into an oriented film structure having improved physical properties comprising a polyolefin such as polypropylene containing incorporated therein additive amounts, on the order of from about 10 percent to about 40 percent by weight of a tertiary butyl substituted aromatic resin, such as poly(para-tertiary-butyl styrene).

2 Claims, No Drawings

ORIENTED THERMOPLASTIC FILMS COMPRISING POLYPROPYLENE AND POLY(PARA-TERTIARY-BUTYL-STYRENE)

BACKGROUND OF THE INVENTION

1. Field of the Invention

The present invention relates to resinous thermoplastic compositions adapted for use in the production of oriented thermoplastic film materials such as oriented polypropylene. Specifically, uncoated biaxially oriented films such as polypropylene have relatively high heat-sealing temperatures, in comparison to many other commercially available thermoplastic films such as, for example, polyethylene film, and have an extremely narrow heatseal range. Moreover, such oriented films exhibit a tendency to disorient, shrink, and tear when attempts are made to seal these films at their prerequisite heat-seal temperatures. In accordance with the present invention, additive amounts of poly(paratertiary-butyl styrene) on the order of from about 10 percent up to about 40 percent by weight based upon the total weight of sample, are incorporated, utilizing conventional techniques, into polypropylene resins prior to the extrusion and orientation of the resinous material into film structures. It has been found that when poly(para-tertiary-butyl styrene) is blended with polypropylene resin in the aforedescribed additive level amounts, it substantially lowers the minimum heat-seal temperature of such oriented polypropylene film products and, additionally, the additive containing oriented film exhibits improved tensile modulus, i.e. stiffness, which improves the processability of such oriented film material on automatic packaging equipment.

2. Description of the Prior Art

In the past, attempts to remedy the hereinbefore discussed defects of oriented polypropylene film, and specifically efforts to improve the heat-seal characteristics and increase the heat-seal range thereof, have included the application of various types of coatings to the oriented film surface such as, for example, vinylidene chloride polymers and multipolymers. Although in some instances, such coating application resulted in an oriented film which exhibited satisfactory heat-seal properties, such coating techniques are time consuming and costly, involving the formulation of special coating materials, treatment of the film surface to be coated utilizing, for example, electronic treatment, and in some instances even priming of the treated film surface with material such as, for example, polyethyleneimine to insure adequate adhesion of the topcoating to the oriented film substrate. In many instances such polymer coatings have deleterious effects on the final coated film product such as resulting in the coated film exhibiting poor blocking characteristics.

Other prior art attempts to improve the heat-seal characteristic of oriented polypropylene films include the employment of various additive materials, which, when incorporated in the polypropylene resin prior to conversion thereof into an oriented film structure, are intended to improve the heat-seal characteristics of the film. U.S. Pat. Nos. 3,313,754 and 3,463,752 are characteristic of the prior art disclosures relating to the employment of additives to improve the properties of oriented polypropylene films. Applicant has found that when prior art additives such as those described in the prior art are employed to alter the oriented film properties, undesirable effects are obtained in the final film, such as film discoloration and a higher coefficient of friction for example. Also, it has been found that certain prior art film additives will increase the blocking tendency of oriented films.

SUMMARY OF THE INVENTION

In accordance with the present invention resinous compositions are provided which may be employed in the fabrication of oriented polypropylene film which exhibits lower heat seal temperatures, broadened heat-seal temperature ranges and increased tensile modulus when compared to oriented film structures which do not contain applicants' modifying additive. The compositions of the present invention comprise polypropylene resin containing additive amounts, on the order of from about 10 per cent up to about 40 per cent by weight, based upon the total weight of polypropylene resin, of poly(para-tertiary-butyl styrene).

DESCRIPTION OF SPECIFIC EMBODIMENTS

Varying amounts of a normally solid poly(para-tertiary-butyl styrene) resin identified by the manufacturer as XPR-49, and having the following properties:

| | |
|---|---|
| Tg (Glass Transition Temperature) | 79 C. |
| Respective Index | 1.540 |
| Ash Content | <0.001 |
| Elemental Analysis | |
| C | 89.9 |
| H | 10.0 |
| Decomposition Temperature | >300° C. |
| Color | Water White |
| Softening Point | 100–120° C. |
| Molecular Weight | 3010 (Weight Average) |
| Molecular Weight | 1520 (Number | were admixed with molten polypropylene resin identified by the manufacturer as Eastman Tenite 423–DF, a high isotactic content, crystalline polypropylene having the following properties:

| | |
|---|---|
| Melt Index | 4.5 |
| Crystalline Melting Point, °F. | 330 |
| Inherent Viscosity | 1.4–1.6 |
| Molecular Weight | 100,000–120,000 |
| Density (grams/cc.) | 0.902 |
| Vicat Softening Point, °F. | 293 |

The polypropylene, poly(para-tertiary-butyl styrene) blends were prepared by fluxing the polypropylene resin at 200° C. in a Brabender Plasticorder for 5 minutes to achieve complete melting of the resin. Poly(para-tertiary butyl styrene) is added slowly and the mixture is mixed for 30 minutes under a nitrogen blanket.

Following the compounding procedure hereinabove described, the admixture was molded into plaques approximately 25 mils thick. The individual plaques were biaxially oriented at temperatures within the range of from about 280° F. up to about 310° F., by stretching the plaques about 250 percent in one direction and subsequently stretching the monoaxially oriented plaque, in a direction perpendicular to the first stretch direction, about 600 percent. The final gauge of the additive containing biaxially oriented film samples was about 1 mil.

In the following Table I, various physical properties of the additive containing, biaxially oriented films, produced in accordance with the above-described procedure are given and compared to a biaxially oriented polypropylene film containing no poly(para-tertiary-butyl styrene). The percentage levels of poly(para-tertiary-butyl styrene) additive are expressed as percent by weight based upon the total weight of the additive containing sample.

In the following Table II, the results of a series of heat seal tests were performed on film samples, identical to the samples tested in preceding Table I, are given. The seals were made utilizing pressures of 20 p.s.i. and a dwell time of 0.5 seconds. The values of the heat seals obtained are expressed in grams per linear inch. The heat seals were measured by sealing together two pieces of the additive containing oriented polypropylene film at temperatures indicated in table II. The values given expressed in grams per linear inch represent the force required to separate the sealed film layers at a rate of about 12 inches per minute utilizing a Suter heat seal tester.

TABLE I

| Percent by weight additive | 0% | 10% | 20% | 30% | 40% |
|---|---|---|---|---|---|
| (1) Coefficient of friction* | .37 | .45 | .44 | .45 | .46 |
| (2) Haze* | 1.0 | 1.8 | 1.7 | 1.5 | 0.9 |
| (3) Gloss* | 87.3 | 87.8 | 92.6 | 91.6 | 91.3 |
| (4) Ball Burst, 72° F. (cm.-kg./mil) | 19.1 | 12.9 | 11.6 | 9.7 | 7.6 |
| (4) Ball Burst, 0° F. (cm.-kg./mil) | 11.3 | 11.2 | 9.9 | 4.3 | 4.0 |
| (5) Modulus, MD (MPSI) | 272 | 268 | 296 | 321 | 303 |
| (5) Modulus, TD (MPSI) | 497 | 556 | 545 | 501 | 520 |
| (6) Blocking (grams per linear inch) | | .7 | .8 | 1.2 | 2.8 |

*ASTM, test designations: (1) = D-189463; (2) = D-1003-61; (3) = D-245-65T.

It will be seen from the foregoing Table I, that the additive containing oriented polypropylene films of the present invention exhibit higher modulus, i.e. stiffness, when compared to oriented polypropylene films containing no poly(para-tertiary-butyl styrene).

TABLE II

| | Seal strengths at— | | |
|---|---|---|---|
| Sealing temperature, ° F | 220 | 240 | 260 |
| Percent by weight additive poly (para-tertiary-butyl styrene): | | | |
| 0 | 0 | 5 | 24 |
| 10 | 0 | 0 | 96 |
| 20 | 0 | 108 | 186 |
| 30 | 0 | 85 | 140 |
| 40 | 0 | 86 | 239 |

As shown, in preceding Table II, the film samples which contained no additive had extremely poor heat seal values at seal temperatures which produced excellent seal values for the poly(para-tertiary-butyl styrene) containing film samples of the present invention. When attempts were made to obtain satisfactory heat seals on the oriented polypropylene film containing no additive, by increasing the heat seal temperature to about 290° F., the film shrank and tore as a result of the disorientation caused by such an elevated temperature.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A thermoplastic resin composition comprising a mixture of an essentially isotactic, crystalline polypropylene containing from about 10 percent up to about 40 percent by weight, based upon the total weight of said mixture, of poly(para-tertiary-butyl styrene).

2. Oriented polypropylene film containing additive amounts of from about 10 percent to about 40 percent by weight of poly(para-tertiary-butyl styrene).

* * * * *

PO-1050
(5/69)

UNITED STATES PATENT OFFICE
CERTIFICATE OF CORRECTION

Patent No. 3,666,834                    Dated  May 30, 1972

Inventor(s) Edward M. Bullard

It is certified that error appears in the above-identified patent and that said Letters Patent are hereby corrected as shown below:

Column 2, line 24, Change "(Number" to --(Number Average)--

Signed and sealed this 23rd day of January 1973.

(SEAL)
Attest:

EDWARD M.FLETCHER,JR.                   ROBERT GOTTSCHALK
Attesting Officer                       Commissioner of Patents